United States Patent
Shen et al.

(10) Patent No.: US 9,542,940 B2
(45) Date of Patent: *Jan. 10, 2017

(54) METHOD AND SYSTEM FOR EXTENDING DIALOG SYSTEMS TO PROCESS COMPLEX ACTIVITIES FOR APPLICATIONS

(71) Applicant: Robert Bosch LLC, Broadview, IL (US)

(72) Inventors: Zhongnan Shen, Milpitas, CA (US); Fuliang Weng, Mountain View, CA (US); Yao Meng, San Jose, CA (US); Madhuri Raya, Sunnyvale, CA (US)

(73) Assignee: Robert Bosch LLC, Broadview, IL (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/796,788

(22) Filed: Jul. 10, 2015

(65) Prior Publication Data

US 2015/0356970 A1 Dec. 10, 2015

Related U.S. Application Data

(63) Continuation of application No. 11/607,497, filed on Nov. 30, 2006, now Pat. No. 9,082,406.

(51) Int. Cl.
*G10L 21/00* (2013.01)
*G10L 25/00* (2013.01)
*G10L 15/22* (2006.01)
*G06Q 30/00* (2012.01)

(52) U.S. Cl.
CPC .............. *G10L 15/22* (2013.01); *G06Q 30/016* (2013.01)

(58) Field of Classification Search
CPC ................................. G10L 15/20; G10L 15/22

USPC ......................................... 704/257, 270, 275
See application file for complete search history.

(56) References Cited

U.S. PATENT DOCUMENTS

| | | |
|---|---|---|
| 5,802,526 A | 9/1998 | Fawcett et al. |
| 6,073,102 A | 6/2000 | Block |
| 6,604,075 B1 | 8/2003 | Brown et al. |
| 6,707,889 B1 | 3/2004 | Saylor et al. |
| 7,114,146 B2 | 9/2006 | Zhang et al. |
| 7,216,073 B2 | 5/2007 | Lavi et al. |
| 7,257,537 B2 | 8/2007 | Ross et al. |
| 7,386,440 B2 | 6/2008 | Balchandran et al. |

(Continued)

FOREIGN PATENT DOCUMENTS

| | | |
|---|---|---|
| EP | 1 315 147 | 5/2003 |
| EP | 1 585 042 | 10/2005 |
| WO | WO2006036328 | 4/2006 |

OTHER PUBLICATIONS

European Search Report for EP 07021369.9-2221, Date Feb. 29, 2008.

(Continued)

*Primary Examiner* — Shaun Roberts
(74) *Attorney, Agent, or Firm* — Norton Rose Fulbright US LLP; Gerard Messina (57) ABSTRACT

A dialog system that includes a dialog manager to manage a conversation between the dialog system and a user, and to associate the conversation with a complex activity, and a plan engine to execute a plan script in connection with the complex activity, the plan script including a set of atomic dialog activities and logic to control a data and sequence flow of the atomic dialog activities, the set of atomic dialog activities being sub-activities of the complex activity, the complex activity being specified via a declarative activity specification language that connects the atomic dialog activities with a process.

20 Claims, 8 Drawing Sheets

(56) References Cited

U.S. PATENT DOCUMENTS

| | | | |
|---|---|---|---|
| 7,457,397 | B1 | 11/2008 | Saylor et al. |
| 8,566,102 | B1 | 10/2013 | Bangalore et al. |
| 2001/0013001 | A1 | 8/2001 | Brown et al. |
| 2002/0087310 | A1 | 7/2002 | Lee et al. |
| 2002/0133355 | A1 | 9/2002 | Ross et al. |
| 2003/0061029 | A1 | 3/2003 | Shaket |
| 2004/0044516 | A1 | 3/2004 | Kennewick et al. |
| 2005/0246174 | A1 | 11/2005 | DeGolia |
| 2006/0074670 | A1 | 4/2006 | Weng et al. |
| 2007/0135101 | A1 | 6/2007 | Ramati et al. |

OTHER PUBLICATIONS

"CapeStudio 3 Technical Overview" Internet Citation, online Mar. 2002, www.capeclear.com/products/whitepapers/CST-TechnicalOverview.pdf.

HTML 4.01 SpecificationW3C Recommendation Dec. 24, 1999 http://www.W3rg/TR/REC-html/40/ineract/scripts.html:18.1 Introduction to scripts.

The following dialog illustrates certain features and functionalities of a dialog manager in the context of a MP3 application:

User: What music do you have?
System: I have pop, rock and soul music. <Using category names>
User: what about some rock.
System: Ok. Here's the song *one world* <System Behavior: Plays a random music selection>
User: Who is this?
System: *Dire Straits*. <Querying context dependent information>
User: What albums do you have by Dire Straits?
System: *Brothers In Arms*. <Discontinuous phrase>
User: What songs are on *Brothers in Arms*?
System: Brothers in Arms has the songs *one world, why worry, brothers in arms, money for nothing, so far away…*
User (interrupting): Play that. <Resolving "that" as the song being listed>
System: <starts playing *so far away*>
User: I meant *money for nothing*.
System: <starts playing *money for nothing* instead>
User: Add this to a playlist.
System: Which playlist do you mean? I have Drivetime and WorkSongs. <Disambiguation>
User: What's on Drivetime?
System: *combination, believe* and *love is the groove*
User: Add it to Drivetime.
System: Ok, added *money for nothing* to playlist Drivetime. <Multi-threaded with adding a song to a playlist vs. clarifying a playlist>
<user plugs in external device containing MP3s>
System: You have 28 new songs. <The song database is updated dynamically, and the user can query/play the new songs>

METHOD AND SYSTEM FOR EXTENDING DIALOG SYSTEMS TO PROCESS COMPLEX ACTIVITIES FOR APPLICATIONS

CROSS REFERENCE TO RELATED APPLICATION

This application is a Continuation of, and claims priority under 35 U.S.C. §120 to, U.S. patent application Ser. No. 11/607,497, filed on Nov. 30, 2006, the entire content of which is incorporated herein by reference.

FIELD OF THE INVENTION

The present invention relates to a method and system for extending dialog systems to process complex activities for applications, such as web services and business transactions.

BACKGROUND INFORMATION

Dialog systems may enhance customer experiences and provide better functionality in various applications. Dialog systems, however, have not been adequately utilized for certain sophisticated applications, such as web services, and self-service centers.

SUMMARY OF THE INVENTION

The present invention involves the integration of language dialog applications with simple and/or sophisticated processes to provide a self-service platform which can drive new business opportunities. In particular, the dialog applications may be integrated with business processes in a service-oriented architecture (SOA) across distributed enterprises.

An exemplary embodiment and/or exemplary method according to the present invention may provide support for complex dialog activities for dialog systems, and may better integrate a dialog system with a process backend. In particular, the exemplary embodiment and/or exemplary method may extend the use of dialog systems for a broader range of applications, such as web services, business transactions, etc. In this regard, the exemplary embodiment and/or exemplary method of the present invention is directed toward extending the dialog management capabilities of the system with respect to its dialog manager. The role of the dialog manager in the dialog system is essentially to interpret semantically incoming user requests and utterances, and perform the appropriate actions on the devices controlled by the dialog system, as well as to generate an appropriate output, such as answers to queries or requests for clarification.

According to an exemplary embodiment of the present invention, an extended dialog manger (DM+) is provided with the functionalities to connect users to various sophisticated processes in a process backend, which may improve the usability of the dialog system and speed up the market acceptance of the dialog system. In this regard, extending the dialog manager may also provide opportunities for business collaboration and additional revenues for enterprises which already invest in speech applications.

According to an exemplary embodiment of the present invention, a dialog system is integrated with a sophisticated process, in a layered system architecture manner. In particular, the dialog manager (DM) of the dialog system is extended to include a plan engine, which facilitates the reusability of the dialog system in a broader range of business models. In this regard, extending the dialog manager (DM) to include a plan engine may also facilitate the connection of the proprietary and atomic actions of the dialog manager (DM) with standard and complex processes, which conform, for example, to BPEL4WS (Business Process Execution Language for Web Services), or with other standards, such as VoiceXML (Voice Extended Markup Language).

According to an exemplary embodiment and/or exemplary method of the present invention, a declarative activity specification language is provided to specify a complex activity, which connects previously developed atomic actions of the dialog manager (DM) with sophisticated processes, including, for example, complex business processes, such as those conforming to BPEL4WS (Business Process Execution Language for Web Services). In particular, external configuration scripts are used to update plans and processes thereby providing a more flexible system. Additionally, the exemplary dialog system may more easily be ported to new domains, and adding new applications and switching complex processes are all made simpler by writing scripts.

An exemplary embodiment of the present invention is directed to a dialog system, which includes a dialog manager to manage a conversation between the dialog system and a user, and to associate the conversation with a complex activity, and a plan engine to execute a plan script in connection with the complex activity, the plan script including a set of atomic dialog activities and logic to control a data and sequence flow of the atomic dialog activities, the set of atomic dialog activities being sub-activities of the complex activity, the complex activity being specified via a declarative activity specification language that connects the atomic dialog activities with a process.

Another exemplary embodiment of the present invention is directed to a dialog system, in which the process is related to at least one of a web service and a business process.

Yet another exemplary embodiment of the present invention is directed to a dialog system, in which the plan engine is configured to interact with a process engine that executes a process script in connection with the process, the process script including a set of atomic process activities and corresponding order constraints of the atomic process activities, the set of atomic process activities being sub-activities of the process.

Still another exemplary embodiment of the present invention is directed to a dialog system, in which the process script conforms to a standard XML-based language designed to accomplish tasks across multiple organizations in a distributed computing environment using a combination of Web services.

Yet another exemplary embodiment of the present invention is directed to a dialog system, in which the process script conforms to BPEL4WS (Business Process Execution Language for Web Services).

Still another exemplary embodiment of the present invention is directed to a dialog system, in which the dialog manager is configured to interpret semantically incoming user requests and utterances, and perform an appropriate action on a device controlled by the dialog system.

Yet another exemplary embodiment of the present invention is directed to a dialog system, in which the dialog manager is configured to maintain a history and current context of the conversation.

Still another exemplary embodiment of the present invention is directed to a dialog system, in which the dialog manager maintains the history and current context via a structure to store the atomic dialog activities as conversational threads.

Yet another exemplary embodiment of the present invention is directed to a dialog system, in which the dialog manager is configured to at least one of provide a report to a user, ask a question, and obtain a parameter value from the user.

Still another exemplary embodiment of the present invention is directed to a dialog system, which includes a dialog manager to manage a conversation between the dialog system and a user, and to associate the conversation with a complex activity, the dialog manager being configured to interpret semantically incoming user requests and utterances, and perform an appropriate action on a device controlled by the dialog system, and a plan engine to execute a plan script in connection with the complex activity, the plan script including a set of atomic dialog activities and logic to control a data and sequence flow of the atomic dialog activities, the set of atomic dialog activities being sub-activities of the complex activity, the atomic dialog activities being stored as conversation threads, the complex activity being specified via a declarative activity specification language that connects the atomic dialog activities with a process related to at least one of a web service and a business process, and the plan engine being configured to interact with a process engine that executes a process script in connection with the process, the process script including a set of atomic process activities and corresponding order constraints of the atomic process activities, the set of atomic process activities being sub-activities of the process, the process script conforming to BPEL4WS (Business Process Execution Language for Web Services).

An exemplary embodiment of the present invention is directed to a method for extending a dialog system to process application activities, the method including managing a conversation between the dialog system and a user, and to associate the conversation with a complex activity, and executing a plan script in connection with the complex activity, the plan script including a set of atomic dialog activities and logic to control a data and sequence flow of the atomic dialog activities, the set of atomic dialog activities being sub-activities of the complex activity, the complex activity being specified via a declarative activity specification language that connects the atomic dialog activities with a process.

Another exemplary embodiment of the present invention is directed to a method for extending a dialog system to process application activities, in which the process is related to at least one of a web service and a business process.

Yet another exemplary embodiment of the present invention is directed to a method for extending a dialog system to process application activities, in which the plan script is executed in conjunction with a process script that is executed in connection with the process, the process script including a set of atomic process activities and corresponding order constraints of the atomic process activities, the set of atomic process activities being sub-activities of the process.

Still another exemplary embodiment of the present invention is directed to a method for extending a dialog system to process application activities, in which the process script conforms to a standard XML-based language designed to accomplish tasks across multiple organizations in a distributed computing environment using a combination of Web services.

Yet another exemplary embodiment of the present invention is directed to a method for extending a dialog system to process application activities, in which the process script conforms to BPEL4WS (Business Process Execution Language for Web Services).

Still another exemplary embodiment of the present invention is directed to a method for extending a dialog system to process application activities, the method including semantically interpreting incoming user requests and utterances, and performing an appropriate action on a device.

Yet another exemplary embodiment of the present invention is directed to a method for extending a dialog system to process application activities, the method including maintaining a history and a current context of the conversation.

Still another exemplary embodiment of the present invention is directed to a method for extending a dialog system to process application activities, the method including storing the atomic dialog activities as conversational threads.

Yet another exemplary embodiment of the present invention is directed to a method for extending a dialog system to process application activities, in which at least one of providing a report to a user, asking a question, and obtaining a parameter value from the user.

DETAILED DESCRIPTION

As discussed, for example, in co-pending U.S. patent application Ser. No. 10/952,069 entitled "Method And System For Interactive Conversational Dialogue For Cognitively Overloaded Device Users", filed Sep. 27, 2004, the disclosure of which is incorporated by reference in its entirety, a conversational dialog system may handle a "natural conversion" interaction between the user and the system. According to an exemplary embodiment and/or exemplary method of the present invention, a conversational dialog system is extended, particularly with respect to the dialog manager (DM), to handle complex dialog activities required from various sophisticated applications such as business processes. In this regard, the following are provided: a definition language for plan script that specifies the complex activities the dialog system is required to process; and a plan engine that executes the activities based on description in the plan script and connects the activities with the process backend.

DEFINITIONS

An "activity" is a reusable behavior within a domain. In this regard, an "atomic activity" is a conceptually simple activity which cannot be further divided into sub-activities, and a "complicated activity" is a conceptually complex activity which can be further divided into sub-activities.

A "process" is a naturally occurring or designed sequence of changes of properties/attributes of a system. In this regard, a "business process" is a description of the tasks and outcomes associated with a business activity. In this regard, a business process specifies the potential execution order of operations from a collection of services and the collaboration among multiple partners. Accordingly, the business process is often drawn, depicting tasks, roles, resources and actions to be taken according to the business needs.

A "plan script" is a file in which the presentation logic of a complex task/application is defined. A plan script may contain a set of atomic activities, data flow and control flow of these activities, the controlling logic of user-system conversations, and the controlling logic of service invocations. In this regard, a plan script may also be used to describe dialog activities people perform to reach certain dialog goals, known as dialog strategies. Such examples may include clarification dialog strategies and error recovery dialog strategies. A "plan engine" executes activities in a plan script.

A "process script" is a file in which the application logic of a complex task/application is defined. A process script consists of a set of atomic activities and order constraints on these activities. A process script may conform to a process execution language, such as BPEL4WS (Business Process Execution Language for Web Services), which is a standard XML-based language designed to accomplish tasks across multiple organizations in a distributed computing environment using a combination of Web services. A process script may also conform to a workflow (scientific or otherwise), or programming language. A "process engine" executes activities in a process script.

Figure 6:
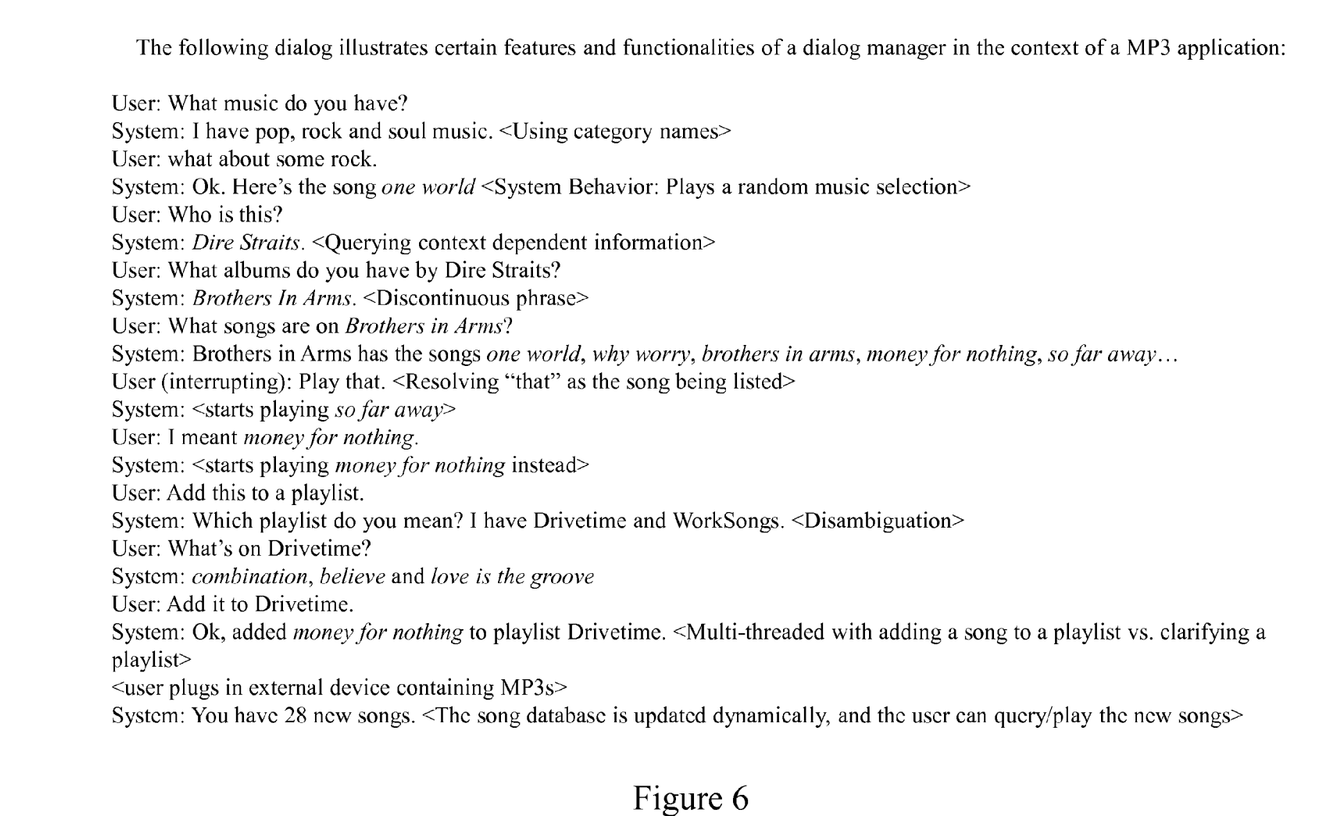
FIG. 6 is a short dialog illustrating certain features and functionalities of a dialog manager in the context of a MP3 application.

A "dialog manager" manages the interaction of a conversation between the user and the system. A purpose of the dialog manager is essentially to interpret semantically incoming user requests and utterances, and perform the appropriate actions on the devices controlled by the dialog system, such as playing a requested song on an MP3 player or searching a restaurant database to match a user's request. Dialog management also involves managing the interaction between the user and system, and generating appropriate output, such as answers to queries or requests for clarification. In this regard, the dialog manager maintains the history and current context of a dialog, and performs tasks such as resolving NPs (i.e. anaphors such as "it" and object descriptions such as "the next intersection"), handling partial sentence fragments (e.g. "here?"), constructing responses to questions from the user, and generally interpreting any user utterances and requests in context. Examples of these capabilities can be found in the sample dialog of FIG. 6. Handling such features is important because they occur in natural dialog. Accordingly, the dialog manager allows the users to speak more naturally, without having to plan carefully what they say.

A "dialog move tree (DMT)" is a tree that represents the structure of a dialog by way of conversational threads, which are composed of the dialog moves (a.k.a., atomic dialog actions or activities) of both participants, and their relations. Hence, the dialog move tree (DMT) provides a structured history of dialog moves and conversational threads, as well as a list of the active nodes of the tree.

A "dialog move tree (DMT) script" defines an atomic dialog move, action or activity. As compared to the plan script, which defines the conversation logic at the application level, the dialog move tree (DMT) script defines the conversation logic at a lower (atomic) level. In other words, the plan script organizes the atomic activities defined by dialog move tree (DMT) scripts in a structured way and at a higher level. That is, the plan script may define a high level complex dialog strategy and manage multiple dialog sessions while the dialog move tree (DMT) script may define atomic activities for a single dialog session.

System Architecture

Figure 1:
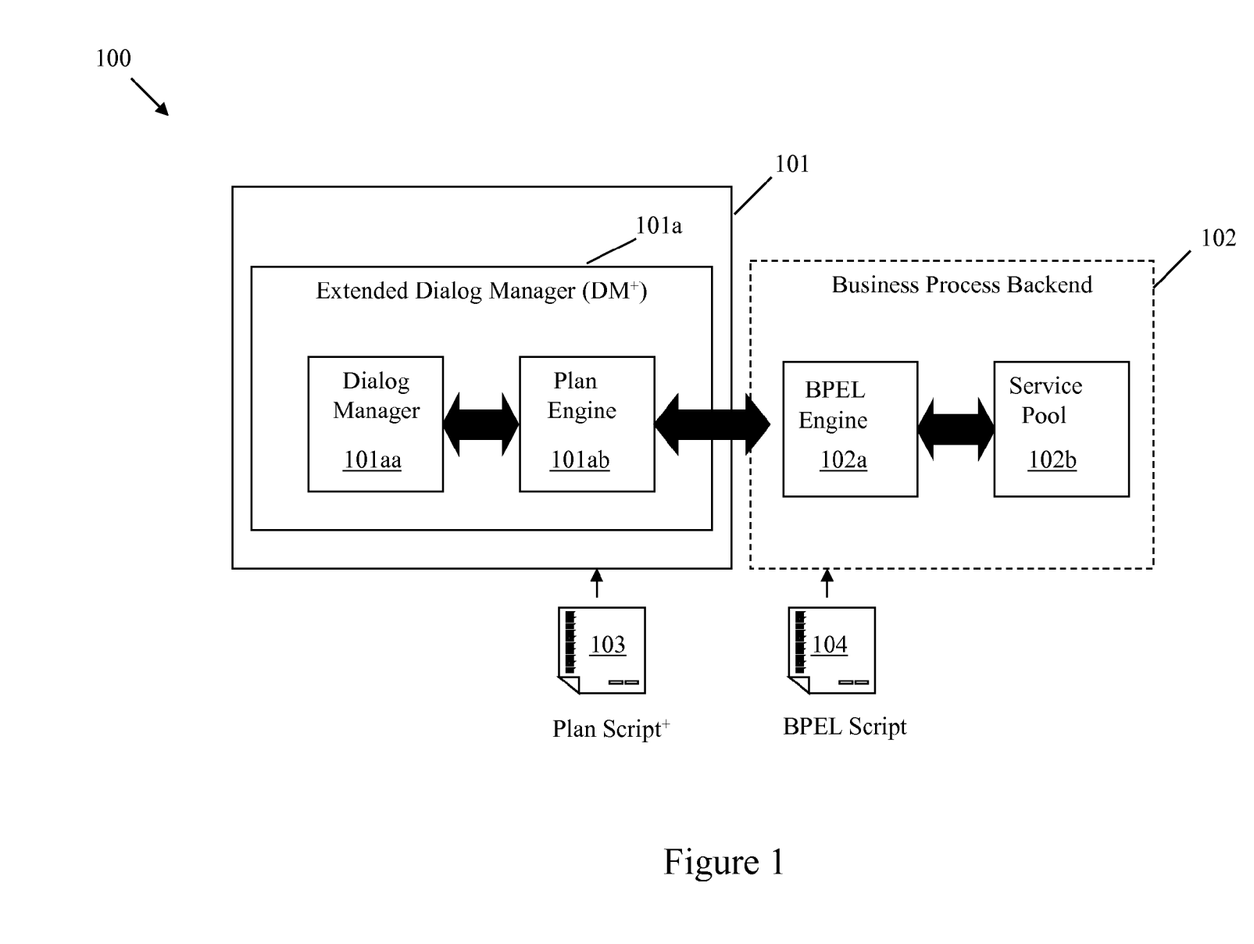
FIG. 1 shows an exemplary system architecture according to the present invention.

FIG. 1 shows an exemplary system architecture 100 according to the present invention. The exemplary system architecture 100 includes a dialog system 101 and a process backend 102. The dialog system 101 includes an extended dialog manager 101*a*, which in turn includes a dialog manager module 101*aa* and a plan engine 101*ab*. The process backend 102 includes a process engine 102*a* and a service pool 102*b*.

Dialog Manager (DM)

Figure 7:
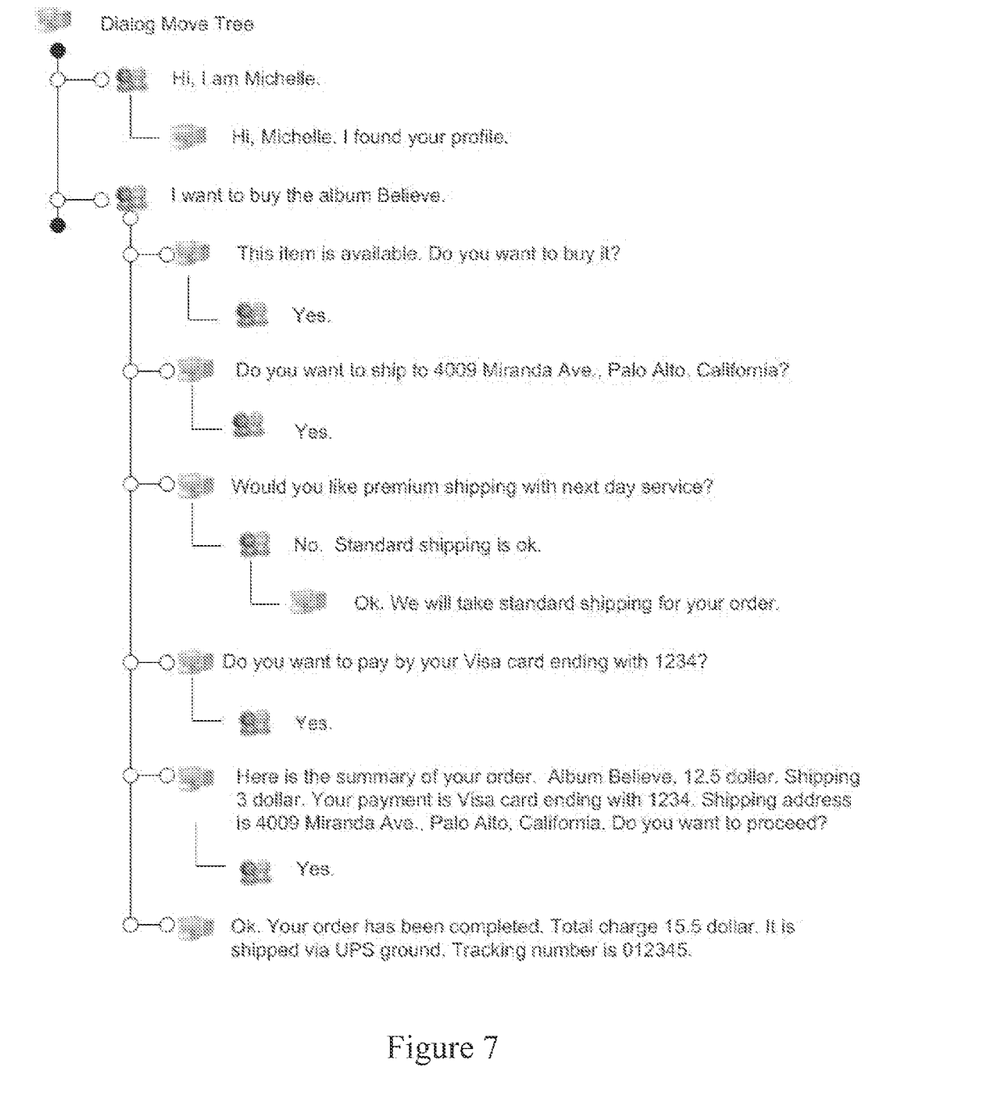
FIG. 7 shows an exemplary embodiment of a dialog move tree (DMT).

The dialog manager (DM) module 101*aa* semantically interprets the user requests and directs the performance of atomic actions. For example, the dialog manager (DM) may interpret a user's request to play a particular song, and in response the dialog manager (DM) may direct the performance of certain actions (a.k.a., "a plan") necessary to play the requested song on a associated MP3 player. In this regard, the dialog manager (DM) may use one or more scripting languages to direct performance of the plan. For example, the dialog manager (DM) module 101*aa* may be specified via two scripting languages: (1) a plan script that defines the atomic actions or activities that the system is capable of performing, and (2) an abstract dialog-scripting language (a.k.a. the dialog move tree (DMT) script) that maps input sentence patterns to basic dialog moves. In this regard, the plan script defines high level complex dialog strategy and manages multiple dialog sessions while the abstract dialog-scripting language script (e.g., DMT script) defines atomic activities for a single dialog session. Accordingly, the dialog state of the interaction between the users and the dialog system 101 may be presented, for example, in the dialog move tree (DMT), an example of which is shown in FIG. 7. The dialog state of the interaction may also be presented as a graph or other suitable structure or state machine.

Plan Engine

The plan engine 101*ab* executes plan scripts 103, which define the atomic actions or sequence of atomic actions to be performed to satisfy a particular user request in a particular user dialog context. In this regard, the plan engine 101*ab* activates certain processes, and collaborates with the dialog manager (DM) module 101*aa* to provide reports to the user, to ask questions and to obtain parameter values from the user. When executing the plan script 103, the plan engine 101*ab* works in parallel with the process engine 102*a* to accomplish the plan.

Process Engine

The process engine 102*a* executes process scripts 104 and communicates with the plan engine 101*ab* using messages to invoke services from the service pool. Here, the process scripts, for example can be BPEL files. BPEL is short for BPEL4WS (Business Process Execution Language for Web services), which is a standard XML-based language designed to accomplish tasks across multiple organizations in a distributed computing environment using a combination of Web services.

Service Pool

The service pool 102b contains all the independently running services (e.g., credit card service, inventory service, shipping service, user profile service and logging service), which represent the participating services by various partners in the sophisticated process.

Plan Engine Design

Figure 2:
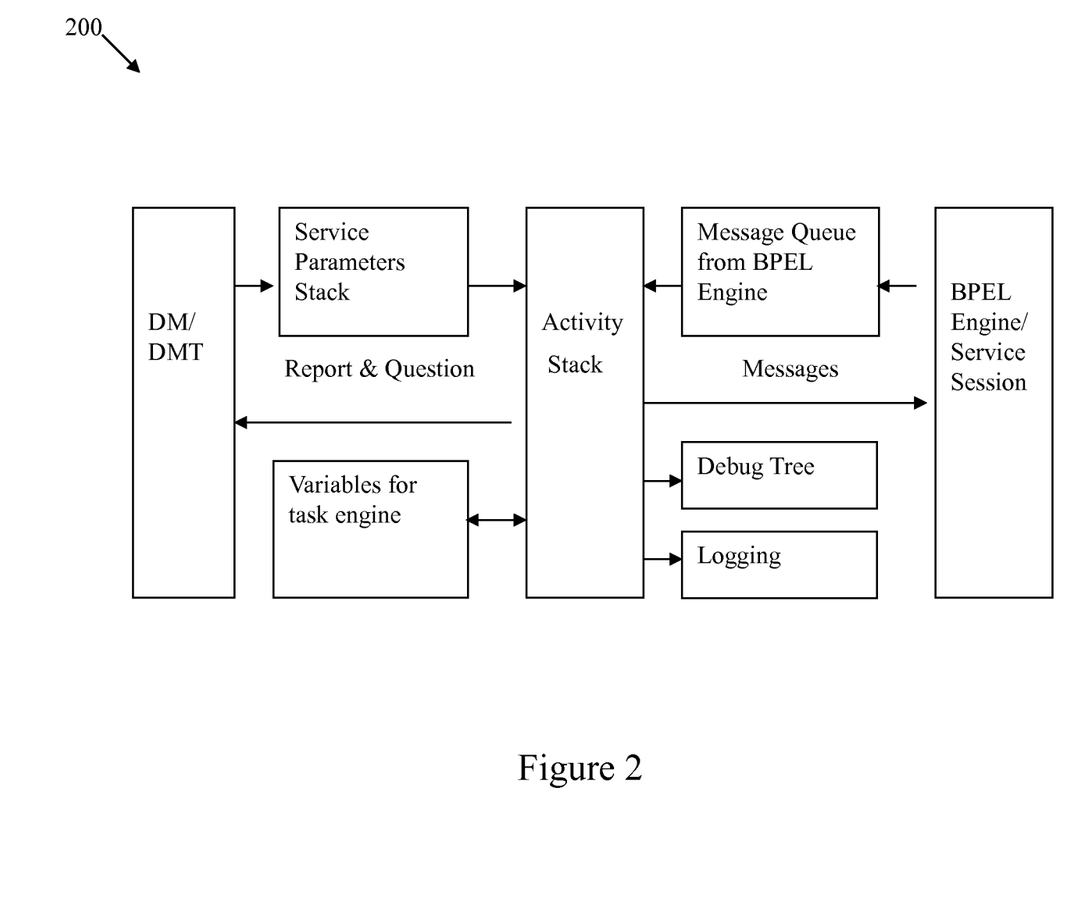
FIG. 2 shows an exemplary plan engine design, which shows the interaction between the plan engine and the dialog manager (DM)/dialog move tree (DMT), and between the plan engine and the process engine.

FIG. 2 shows an exemplary plan engine design 200, which shows the interaction between the plan engine and the dialog manager (DM)/dialog move tree (DMT), and between the plan engine and the process engine. In particular, the plan engine interacts with the dialog manager (DM)/dialog move tree (DMT) to handle reporting and questions, and to obtain activity parameter values. Here, the plan engine may interact with the process engine using messages to perform the plan activities. In this regard, the plan engine may employ the use of an activity parameter stack, an activity stack, a message queue, certain variables, a debug tree, and logging resources.

The exemplary plan engine design 200 provides support for the processing of the plan. In this context, a plan consists of activities. For example, the flow of a "purchase" plan may be described as follows:

A user identifies him/herself;
A user selects a product to purchase;
The system checks if the product is available in inventory;
The system attempts to retrieve user information stored in the customer database, such as a shipping address and credit card number;
The system asks for address or credit card number information from the user if the information is not available in customer database;
The system charges the credit card; and
The system schedules the shipping.

The flow in the plan script 103 must satisfy the intrinsic dependency of the steps specified in the process script 104. For example, a user can identify him/herself either before or after s/he selects a product in the plan script. However, the plan script must collect the user information before it sends a request to the process script to charge the credit card or schedule the shipping.

The flow of process activities in the plan script 103 is logically consistent with the flow of process script 104 so that they can work together. For example, to check inventory, the plan engine 101ab sends a message which contains a product identifier to the process engine 102a. The process script 104 defines how to check the inventory and which service should be invoked. Upon completion, the process engine 102a sends a response message with the result back to the plan engine 101ab.

According to an exemplary embodiment of the present invention, there are two groups of activities in plan script: activities associated with the extended dialog manager (DM+) 101a and activities with the process engine 102a. The activities associated with the extended dialog manager (DM+) 101 may include, for example, requesting the dialog manager (DM) 101aa to provide a report to the user. Here, a <report> element in the plan script 103 is mapped to a template sentence defined in the dialog move tree (DMT) script. In this regard, the plan engine 101ab creates a dialog move tree (DMT) system node in the dialog move tree (DMT), and thereafter the extended dialog manager (DM+) 101a outputs the sentence to the user according to dialog move tree (DMT). The activities associated with the extended dialog manager (DM+) 101a may also include requesting the dialog manager (DM) 101aa to ask questions. Here, a <question> element in the plan script 103 is mapped to a template question defined in the dialog move tree (DMT) script. The plan engine 101ab will create a dialog move tree (DMT) system node in the dialog move tree (DMT). The extended dialog manager (DM+) 101a will ask the question, obtain the answer from the user and inform the plan engine 101ab. The activities associated with the extended dialog manager (DM+) 101 may also include requesting the dialog manager (DM) 101aa to obtain activity parameter values from the user. Here, when the atomic dialog move (corresponding to an atomic action) is generated, it resolves the parameters associated with this action by interacting with the user and forwards it to the plan engine 101ab.

Activities associated with the process engine 102a may include, for example, sending a message to the process engine 101a to invoke a service and get a reply. For each activity which needs to be accomplished by the sophisticated process in the process backend 102, the plan engine 101ab sends a request message to the process engine 102a. The process engine 102a will invoke a dedicated service from the service pool 102b for that request and reply back to the plan engine 101ab. The flow of the activities which are associated with the process engine in the plan script 103 corresponds to the flow of process script 104.

The plan engine 101ab connects the extended dialog manager (DM) 101 and the process engine 102. It coordinates user interaction with a sophisticated process by a simple yet powerful scripting language. The plan script 103 works with both the dialog move tree (DMT) script and the process script 104, and encapsulates all the integration logic for the dialog system 101 and the process backend 102. With customized plan scripts 103, the extended dialog manager (DM+) 101a is flexible enough for language applications to combine with various sophisticated processes in different domains.

Overall System Framework

Figure 3:
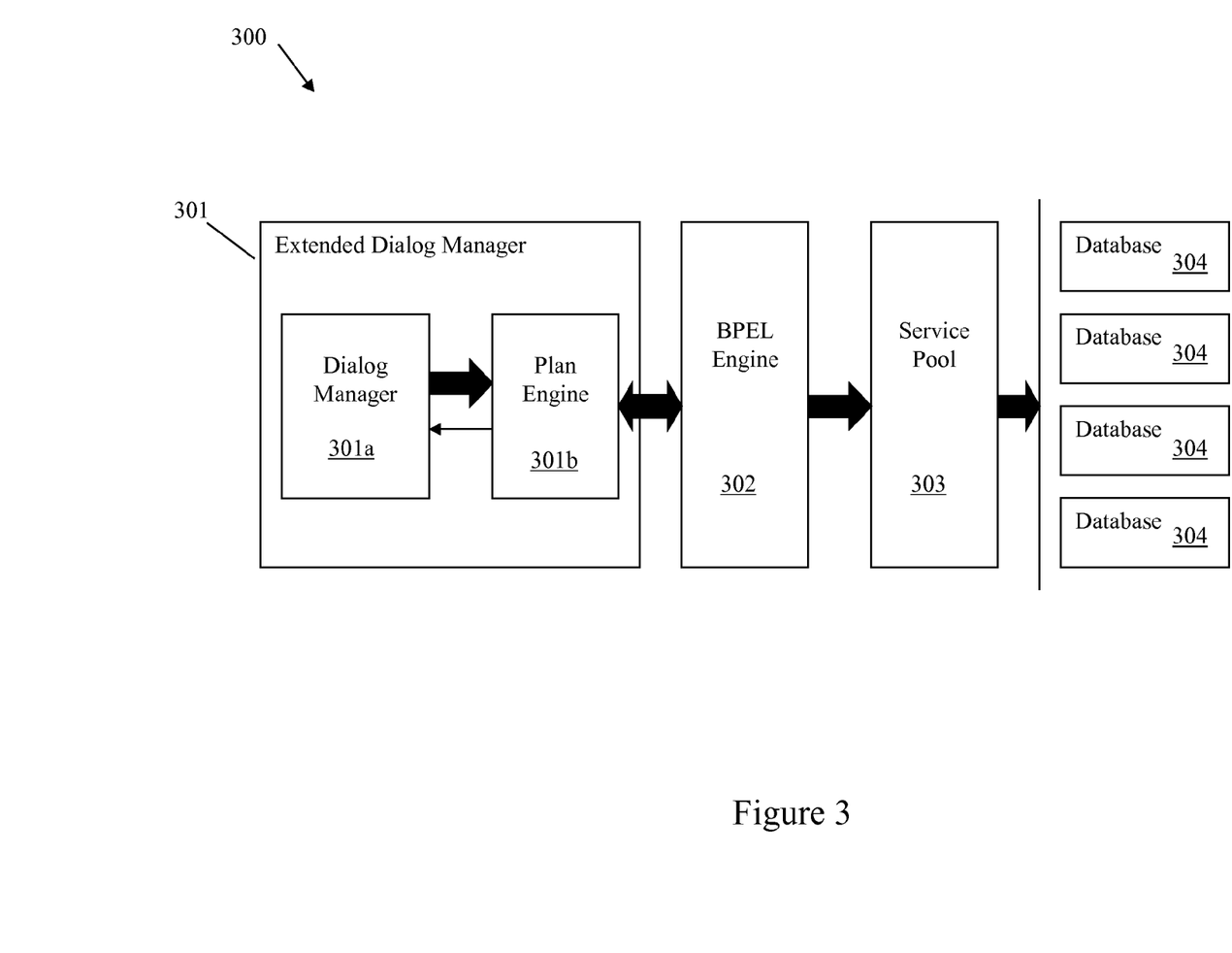
FIG. 3 shows an exemplary system framework of the present invention, in which a dialog manager (DM) is extended to handle complex business processes.

FIG. 3 shows an exemplary system framework 300 of the present invention, in which a dialog manager (DM) is extended to handle complex processes. The exemplary system architecture system framework 300 includes an extended dialog manager (DM+) 301, a process engine 302, a service pool 303, and one or more databases 104. The extended dialog manager (DM+) 301 includes a dialog manager (DM) 301a and a plan engine 301b.

The plan engine 301b is used to perform complex plans/processes. A plan is described by a plan script which is interpreted by the plan engine 301b. The process engine 302 executes process scripts. Here, a process script is a process which composes services in the service pool 303 to complete a certain task. The plan engine 301b can be seen as a client of the process engine 302. The service pool 303 contains services which are running independently.

The following example is used to explain each module. Here, the example plan is a "purchase" task and the task flow is described as follows:

1) The user identifies him/herself;
2) The user buys a product;
3) The system checks if the product is available in inventory;
4) The system checks for user information in the customer database, such as shipping address and credit card number;
5) The system gets an address or credit card number from the user if they are not available;

6) The system charges the credit card; and

7) The system schedules the shipping.

Plan Engine

According to an exemplary embodiment of the present invention, a plan consists of atomic activities. Here, there may be two groups of activities: (1) activities associated with the user (user activities) and (2) activities associated with the process engine (process activities) 302. User activities include providing a report to the user, asking a question, and collecting information or answers. Process activities include invoking the process engine 302 to perform some service invocations.

The flow in the plan script must satisfy the intrinsic dependency of the steps specified in the process script. For example, a user can identify him/herself either before or after s/he selects a product in the plan script. However, the plan script must collect the user information before it sends a request to the process script to charge the credit card or schedule the shipping.

The flow of process activities in the plan script is logically consistent with the flow of the process script so that they can work together. For example, a process activity in the "purchase" example may be "check inventory". In response, the plan engine 301b sends a message which contains the product identifier to the process engine 302. The process script defines how to check the inventory and which service should be invoked. After the activity is performed, the process engine 302 sends a message back to the plan engine 301b, which gives the result to it. From this point of view, the plan engine 301b works as the client side of the process engine 302 and the process engine 302 performs the actual service invocations.

Connection to the DM

The plan engine 301b interacts with the atomic actions specified/performed in the dialog manager (DM) 301a, including:

(1) to request that the DM to send a report to the user, (2) to request that the DM to ask the user a question and get answer from the user, and (3) to request that the DM to obtain information, such as activity parameter values, from the user.

These aspects are explained below in further detail.

Providing a Report to the User

If the plan engine 301b needs to provide a report to the user which is specified in the plan script, it creates a node in the dialog move tree (DMT). In this instance, for example, the plan engine 301b may provide a report to the user for the availability of the product. In particular, the plan script may specify a <report> activity which corresponds to a system node in dialog move tree (DMT) script to output a sentence to the user. Thereafter, when the plan engine 301b performs the <report> activity, it will create a dialog move tree (DMT) node and let the dialog manager (DM) 301a to output this sentence to the user. An exemplary reporting plan script is as follows:

```
<report dmtReport="Report:buy:inventory" />.
The "Report:buy:inventory" may be defined in the DMT script as
following:
System Report:buy:inventory{
    Output {
        "Sorry, The item is not available now."
    }
}.
```

Ask a Question and Obtain an Answer

If the plan engine 301b needs to ask the user a question which is specified in the plan script, it creates a node in the dialog move tree (DMT). For example, the plan engine 301b may ask the user if he wants to pay by credit card. In this regard, the plan script may specify a <question> activity which corresponds to a system node in dialog move tree (DMT) script to ask for Yes or No question and get confirmation from user. Thereafter, when the plan engine 301b performs the <question> activity, it will create a dialog move tree (DMT) node and request the dialog manager (DM) 301a to ask the question. The dialog manager (DM) 301a also gets the answer from the user and informs the plan engine with the answer. An exemplary question script is as follows:

```
<question dmtInput="YNQuestionNoConfirm:ServiceCmd:buy:card"
outputVariable="ynAnswer">
    <mapping from="card" to="userinfoResponse.String_2" />
</question>
```

Here, the "YNQuestionNoConfirm:ServiceCmd:buy:card" may be defined in the dialog move tree (DMT) script as follows:

```
System YNQuestionNoConfirm:ServiceCmd:buy:card {
    Output {
        "Do you want to pay by your credit card [card]?"
    }
}
```

Get Parameter Values from the User

The dialog manager (DM) 301a may resolve activity parameters for the plan engine 301b. A parameter is a piece of information that the plan engine 301b receives from the user, which may include, for example, a product identifier, shipping address, credit card number, etc. To have the dialog manager (DM) 301a resolve activity parameters, these parameters are associated with atomic actions of dialog manager (DM) 301a which are defined in the plan or process activity script. Slots are attached to atomic actions. The slots are parameters that need to be filled by the user. The dialog manager (DM) 301a will resolve all the slots with the user and forward them to the plan engine 301b. In this way, the plan engine 301b can utilize the dialog manager (DM) 301a to resolve activity parameters for it For example, three atomic dialog moves of dialog manager (DM) 301a may be defined in the dialog move tree (DMT) script: buyProduct, addAddress, addCard. The buyProduct dialog move is used to resolve the identifier of the product, the addAddress dialog move is used to get the address from the user, and the addCard dialog move is used to get the credit card number from the user. The dialog move tree (DMT) script for each atomic dialog move defines the conversation between the user and the dialog manager (DM) 301a to resolve the slots.

After the user says "buy xxx", the dialog manager (DM) generates an atomic dialog move, attaches a node of buyProduct to dialog move tree (DMT), and resolves the parameter of product identifier. This node is then forwarded to the plan engine 301b, which retrieves the purchase plan script and runs it, and therefore the purchase process is started. During the process, if the plan engine 301b needs the shipping address from the user which is specified by the plan script, it will trigger the addAddress atomic move of the dialog manager (DM) 301a. Then an addAddress node is attached to dialog move tree (DMT), the parameter is resolved by the dialog manager (DM) 301a, and the node is forwarded to the plan engine 301b. The plan engine 301b gets the shipping address from the atomic action.

An exemplary dialog move tree (DMT) script for addAddress action is as follows:

```
User ServiceCmd:addAddress{
    Description "Add user address to the database"
    Input {
        useX = "s{ predicate{#ship/vb}, ?adjunctlist
        {#to/in,pobj:shipAddress}}}"
    }
    Producing {
        // Questions
        System WHQuestion:fill:addAddress:shipAddress {
            Output {
                "Please give your address?"
            }
            Expecting {
                CloseOn User
                Answer:np:addAddress:shipAddress {
                    Input {
                        //ship address
                        shipX = "s{npfragment
                        {#/nn:shipAddress}}
                        Syn(shipX)
                        MyAddressIs(shipX)
                        ItIs(shipX)
                        TheAddressIs(shipX)
                    }
                }
            }
        }
        CloseOn System Report:addAddress:done {
            Output {
                "The address [address] is added to your profile."
            }
        }
    }
}
```

Here, the useX line in the Input section of the above script specifies a pattern the input sentence should match. The plan script which specifies that a shipping address is needed may be as follows:

```
<subtask name="getaddr" nist_task="addAddress" nist_verb="ship"
inputVariable="updateAddrRequest" outputVariable=
"updateAddrResponse" >
    <assign>
        <copy>
            <from slot="shipAddress" />
            <to variable="updateAddrRequest" part="String_2" />
        </copy>
    </assign>
</subtask>
```

The nist_task attribute defines the atomic action it is waiting for to get the parameter. The nist_verb attribute defines the verb which is used to trigger the atomic action. When the plan engine performs this <subtask>, it first checks if the addAddress atomic action is available or not. If it is not available, it will use the verb to trigger it. After the atomic action is created by the dialog manager (DM) 301a and the shipAddress slot is resolved, the <copy> tag will copy the "shipAddress" to a variable in the plan script, so that the plan engine 301b gets the "shipAddress" parameter.

Connection to Process Engine

The plan engine 301b and the process engine 302 should work together to accomplish a complex task. Plan scripts and process scripts are paired. The process activities in the process script are actually the server to some activities in the plan script.

For example, the plan script and process script may work together to schedule the shipping. In the plan script, a shipping Request is sent to the process engine 302. Here, the shipping request may contain information about shipping address. In the process script, it first receives a shipping Request from the client (plan engine 301b), then invokes the shipping service in the service pool, finally it replies to the plan engine 301b with a shipping Response which contains a tracking number.

Design of the Plan Engine

Figure 4:
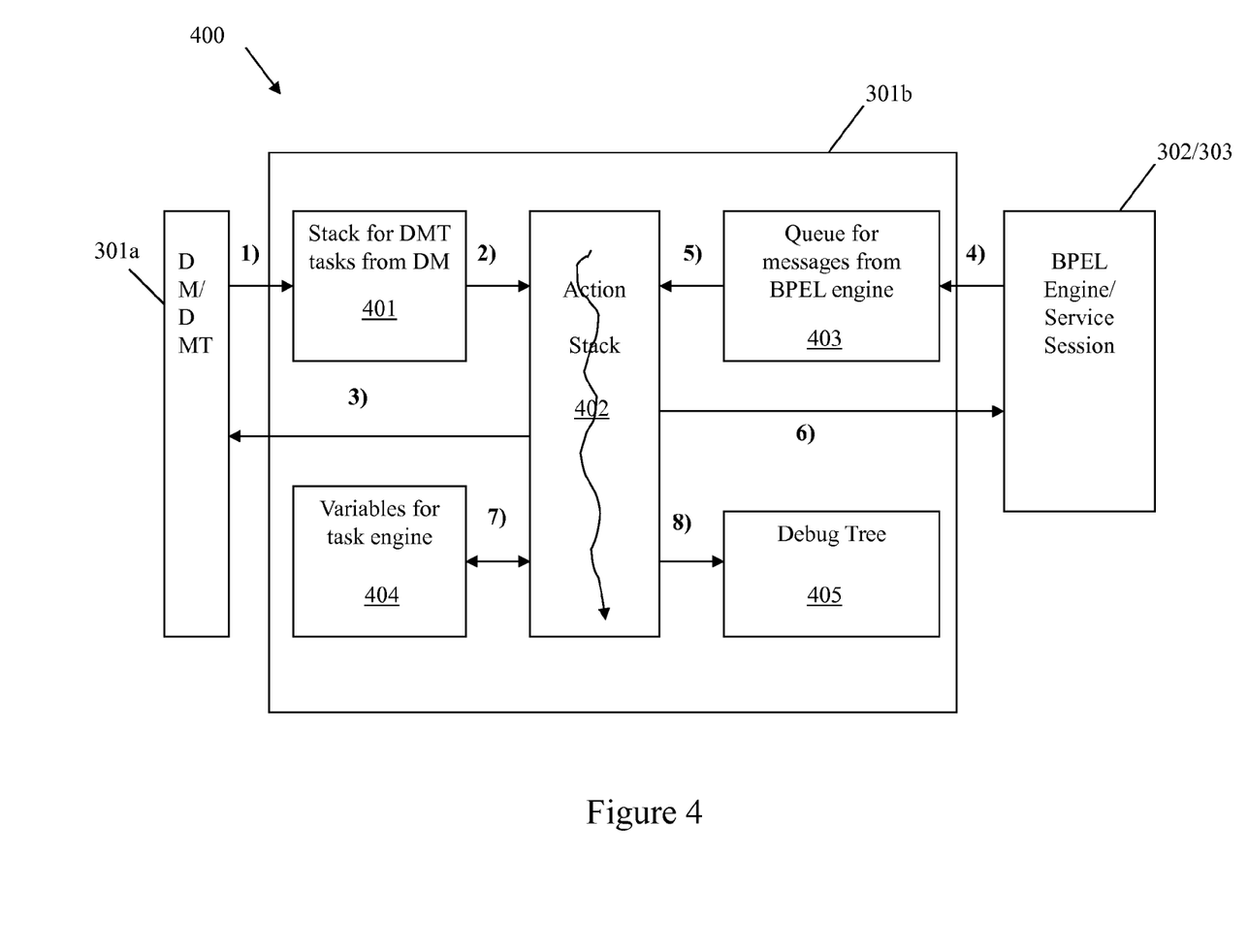
FIG. 4 shows an exemplary internal architecture of the plan engine of FIG. 3.

FIG. 4 shows an exemplary architecture 400 of the plan engine 301b of FIG. 3. The exemplary architecture 400 includes a stack 401 for the atomic dialog moves issued from the dialog manager (DM) 301a, an activity stack 402, a queue 403 for messages from the process engine, variables 404 for the plan engine, and a debug tree 405. The activity stack 402 contains all the activities need to be performed by the plan engine 301b. The plan engine 301b obtains activities from this stack 402 and executes them accordingly. The debug tree 405 provides debugging of the plan engine.

An exemplary operation of the plan engine 301b, in terms of how the exemplary architecture 400 components interact with the dialog manager (DM) 301a, the process engine 302, and amongst themselves is as follows.

1) When the dialog manager (DM) 301a creates an atomic move, it puts it into the dialog move tree (DMT) atomic move stack 401.
2) When the plan engine 301b hits a <subtask> activity or <pick> activity which requires an atomic dialog move, the plan engine 301b looks through the dialog move tree (DMT) atomic move stack 401 to check if the atomic move is ready. If the required atomic move is not ready and the current activity is <subtask> activity, the plan engine 301b triggers the atomic dialog move.
3) The plan engine 301b requests the dialog manager (DM) 301a to give a report, ask a question or trigger an atomic dialog move.
4) The process engine 302 sends back responses to the plan engine 301b. Response messages are put into the queue 403.
5) The plan engine 301b receives response messages from the message queue 403 when a <subtask> activity expects a response from the process engine 302
6) The plan engine 301a sends request messages to the process engine 302 when <subtask> activities are executed.
7) Variables in the plan engine 301a are defined in the plan script. These variables 404 keep status information for the plan engine 301a. The variables 404 are assigned values by <assign> activities. Messages sent to the process engine 302 are constructed from the variables 404. The messages received from the process engine 302 are used to update and/or modify the variables 404.
8) Each time the plan engine 301b runs an activity, a debug node for this activity will be created and put into the debug tree 405. The debug tree 405 may be shown, for example, in a debug panel so that the developer can see the current state of the plan engine 301b. The variables 404 in the plan engine 301b are also shown in the debug tree 405.

Task Debug Panel

According to an exemplary embodiment of the present invention, a debug panel is provided in the debug window to show status of the running plan engine. Here, a debug node is created for each execution of each activity in the script and inserted into the debug tree.

Process Engine

The process engine is used to run process scripts. As explained in detail above, the process engine works with the plan engine. A process consists of activities. In this regard, a process script may be, for example, a BPEL file which follows the syntax of Business Process Execution Language for Web Services v1.1.

Design of the Process Engine

Figure 5:
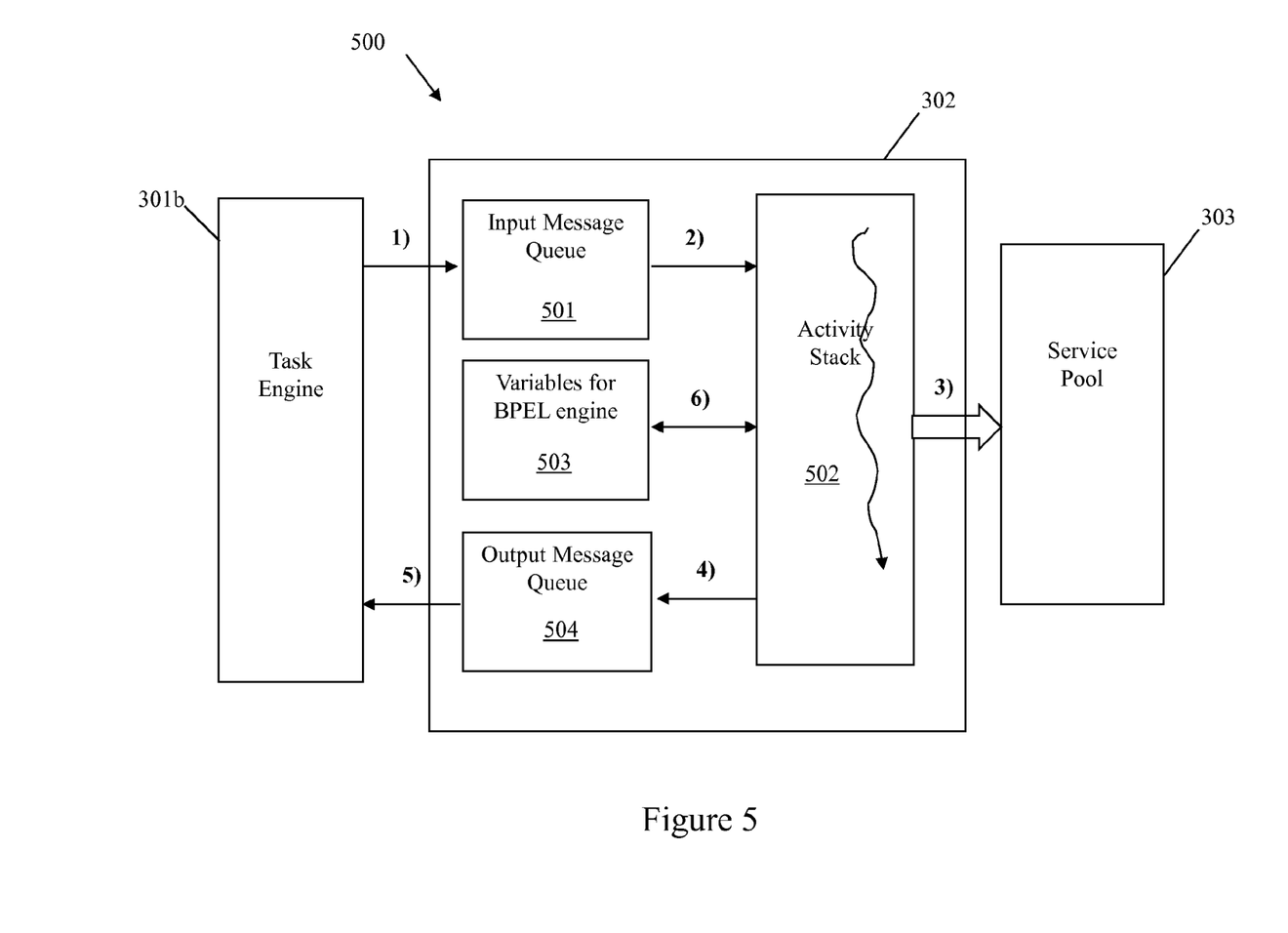
FIG. 5 shows an exemplary internal architecture of the process engine of FIG. 3.

FIG. 5 shows an exemplary architecture of the process engine 302 of FIG. 3. The exemplary architecture 500 includes an input message queue 501, an activity stack 502, variables 503 for the process engine 302, and an output message queue 504. The activity stack 502 contains all the activities need to be performed by the process engine 302. The process engine 302 gets activities from this stack 502 and executes them accordingly.

An exemplary operation of the process engine, in terms of how the exemplary architecture 500 components interact with the plan engine 301b, the services 303, and amongst themselves is as follows.

1) Messages from the plan engine 301b are put into the input message queue 501
2) When the process engine 302 needs a message (such as <receive> activity), it gets it from the input message queue 501.
3) The process engine 302 invokes services from the service pool 303.
4) When the process engine 302 sends back a message to the plan engine 301b (such as <reply> activity), the message is put into the output message queue 504.
5) A thread is running to get messages out of the output message queue 504 and send back messages to the plan engine 301b.
6) Variables 503 in the process engine 302 are defined in the process script. These variables 503 keep status information for the process engine 302. The variables 503 are assigned values by <assign> activities. Messages sent to the services are composed from variables and messages received from services are used to update and/or modify the variables 503.

Service Manager

A service manager manages all the services and processes. It parses all the service description files such as Web Service Descriptive Language (WSDL) files, and process scripts.

Service Pool

The service pool contains all the independently running services.

Logging

All events in the system may be logged.

Process Script

According to an exemplary embodiment of the present invention, a process script can be a business process file which conforms to BPEL4WS (Business Process Execution Language for Web Services).

Plan Script

According to an exemplary embodiment of the present invention, the language which defines plan scripts is in XML. In this regard, the plan script may include an element <task> as the top level tag that defines a plan which works with a process script. An attribute of this element specifies the atomic dialog move which will start this plan. For example, the purchase plan is started by the atomic move "buyProduct" of the dialog manager (DM) 301a.

The plan script may include an element <variables> to define variables, as in the process script. The plan script may include the <assign> element as in the process script and a "slot" attribute in the <from> element which indicates the value is copied from the slot of an atomic dialog move. If this <assign> is imbedded into a <subtask> activity which requires an atomic dialog move, the slots are associated with this atomic action. Otherwise, the slots are associated with the atomic action required by the top level <task>.

The plan script may also include a <report> element which has an attribute to specify the report that the dialog manager (DM) should speak to the user as defined in the dialog move tree (DMT) script. A report can take parameters and map parameters to values. The plan script may also include a <question> element, which may have an attribute specifying the confirmation question that the dialog manager (DM) should ask the user. The question is defined in dialog move tree (DMT) script. A question can take parameters and map values to parameters.

The plan script may also include a <subtask> element, an example of which is shown below:

```
<subtask name="getaddress" nist_task="addAddress" nist_verb="ship"
     inputVariable="updateAddrRequest"
     outputVariable="updateAddrResponse" >
   <assign>
       <copy>
         <from slot="shipAddress" />
         <to variable="updateAddrRequest" part="String_2" />
       </copy>
   </assign>
</subtask>
```

The "nis_task" attribute and the "nist_verb" attribute are optional. If they exist, it means the <subtask> can require an atomic action. When the plan engine executes <subtask> activity and an atomic action is required, it checks the dialog move tree (DMT) atomic move stack. If the atomic move is not there, the engine will use a verb which is specified as a <subtask> attribute to trigger the atomic move. It can also specify sending a message to the process engine and getting a response from the process engine.

The <assign> activity can be embedded into the <subtask> activity. When a slot value is to be copied from a dialog move tree (DMT) atomic action which is required by the <subtask> activity, it is embedded into the <subtask> activity.

The plan script may also include the <pick> element and multiple <onTask> sub-elements, one of which will be chosen. When the plan engine executes the <pick> activity, it will check the dialog move tree (DMT) atomic action stack and execute activities under that <onTask> tag. Which branch is executed depends on which dialog move tree (DMT) atomic action is found in the dialog move tree (DMT) task stack and which is the newest.

A Combined Approach

Figure 8:
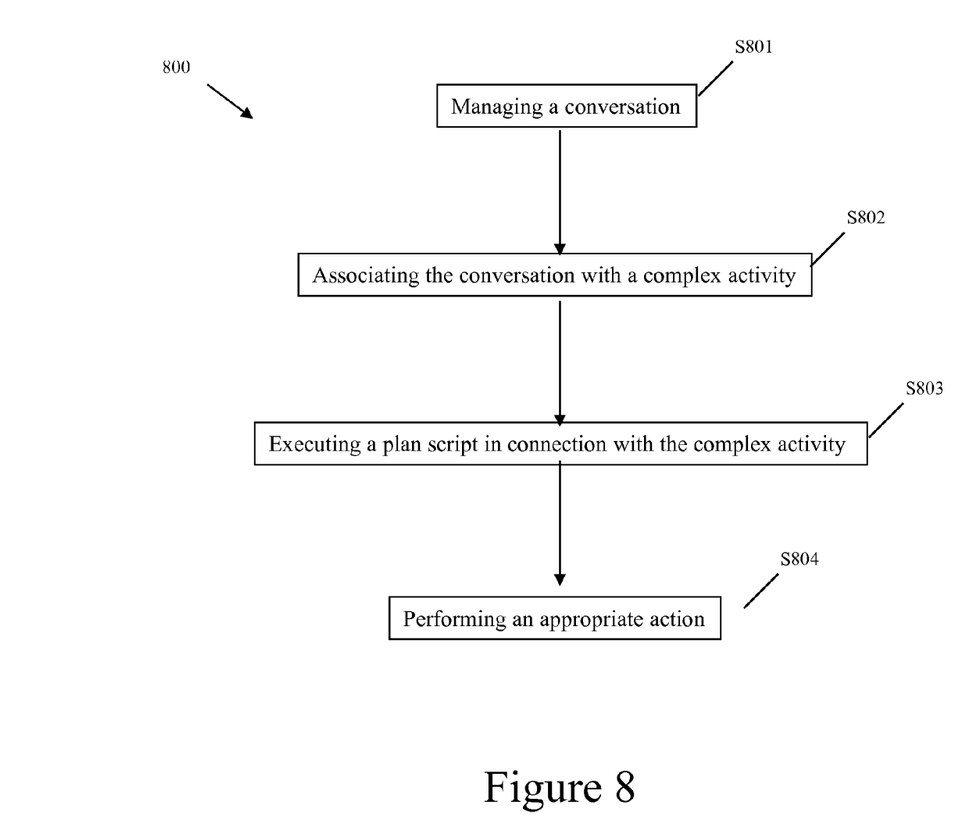
FIG. 8 shows an exemplary method for extending a dialog system to process application activities, such as a web service and/or business transaction.

FIG. 8 shows an exemplary method 800 for extending a dialog system to process application activities, such as a web service and/or business transaction. The dialog system may include, for example, a dialog manager to manage the conversation between the system and the user, and a plan engine to better facilitate the connection of atomic actions of the dialog manager with a process backend that provides the external interface to the web service and/or business transaction. The exemplary method is as follows:

In step S801 a conversation between the dialog system and a user is managed. Here, for example, the incoming user requests and utterances may be interpreted semantically, and a history and current context of the conversation may be maintained, so that the dialog system may interact with the user in a more natural manner. In this regard, the dialog system may pose a question to the user, and/or may obtain one or more parameter values from the user.

In step S802 the conversation is associated with a complex activity. As explained in detail above, a "complex activity" is an activity (i.e., a reusable behavior with a domain) that may be conceptually divided into sub-activities, whereas an "atomic activity" is a conceptually simple activity which cannot be further divided into sub-activities. In particular, the conversation is associated with a complex dialog activity, which in turn, may relate to one or more atomic dialog activities that are stored by the dialog system as conversational threads. In this regard, the complex activity may be specified via a declarative activity specification language that connects atomic dialog activities with a process, which is related, for example, to the web service and/or a business process.

In step S803 a plan script is executed in connection with the complex activity. In this instance, the plan script may include a set of atomic dialog activities and corresponding order constraints of the atomic dialog activities, with the set of atomic dialog activities including sub-activities of the complex activity. The plan script may be executed in conjunction with a process script that is executed in connection with the process. The process script includes a set of atomic process activities and corresponding order constraints of the atomic process activities, the set of atomic process activities being sub-activities of the process. In this regard, the process script may conform to a standard XML-based language designed to accomplish tasks across multiple organizations in a distributed computing environment using a combination of Web services. In particular, the process script may conform to BPEL4WS (Business Process Execution Language for Web Services).

In step S805, an appropriate action is performed. Here, for example, the appropriate action might be an operation related to a particular a device, such as a car radio or navigation system. Upon completion of the appropriate action a report may be provided to the user, which indicates the action is complete and/or that further action may be required.

The exemplary message embodiments and/or exemplary methods described herein may be implemented in the general context of computer-executable instructions, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

An implementation of the exemplary embodiment and/or exemplary methods may be stored on or transmitted across some form of computer readable media. Computer readable media can be any available media that can be accessed by a computer. By way of example, and not limitation, computer readable media may include computer storage media and communications media.

What is claimed is:

1. A system comprising:
    an input device configured for receiving user dialogue input;
    an output device configured to output system dialogue output;
    processing circuitry;
    an interface communicative coupling the processing circuitry to a plurality of service provider components; and
    a data storage device that stores definitions of a plurality of atomic dialogue activities, a plurality of complex dialogue activities, a plurality of atomic service processes, and a plurality of complex service processes;
    wherein:
        each of the complex dialogue activities is formed by an ordered subset of the plurality of atomic dialogue activities;
        each of the complex service processes is formed by an ordered subset of the atomic service activities;
        the processing circuitry is configured to:
            responsive to a first user dialogue input obtained via the input device, select one of the complex dialogue activities and one of the complex service activities;
            execute the selected complex dialogue activity by executing at least some of the atomic dialogue activities of the selected complex dialogue activity;
            insert a node that corresponds to the selected complex dialogue activity in a hierarchical dialogue structure that hierarchically records nodes that correspond to the atomic dialogue activities of one or more of the complex dialogue activities, and that represent respective user dialogue inputs and system dialogue outputs;
            execute the selected complex service activity by executing the atomic service activities of the selected complex service activity, the execution of the atomic service activities including obtaining a service by one or more of the plurality of service provider components via the interface;
            responsive to a second user dialogue input, use the hierarchical dialogue structure to determine whether the second user dialogue input corresponds to any of the nodes of the hierarchical dialogue structure that have been recorded for the selected complex dialogue activity; and
            execute an algorithm by which the processing circuitry updates the hierarchical dialogue structure to include a new node representing the second user dialogue input such that the new node is hierarchically associated with other nodes representing the selected complex dialogue activity when the determination is that the second user dialogue input corresponds to at least one of the nodes that have been recorded for the selected complex dialogue activity, and otherwise is set as a new top hierarchical level node corresponding to another of the complex dialogue activities which is responsively invoked; and
        the execution of at least one of the atomic dialogue activities of the selected complex atomic dialogue activity uses an output of the execution of at least one of the atomic service activities of the selected complex service activity.

2. The system of claim 1, wherein the definition of the at least one of the atomic dialogue activities includes a variable, a value for which is obtained from the output of the execution of the at least one of the atomic service activities.

3. The system of claim 2, wherein the definition of at least one of the atomic service activities includes a variable, a value for which is obtained from a node of the hierarchical dialogue structure representing a user dialogue input.

4. The system of claim 2, wherein the definition of at least one of the atomic dialogue activities includes a variable, a value for which is obtained from a node of the hierarchical dialogue structure representing a user dialogue input.

5. The system of claim 1, wherein the processing circuitry is configured to resolve an ambiguity in a received user dialogue input based on a dialogue context indicated in the hierarchical dialogue structure.

6. The system of claim 1, wherein the processing circuitry is configured to maintain in the data storage device a first queue of user information obtained by the execution of the complex dialogue activity and a second queue of result information obtained by the execution of the complex service activity, use the user information of the first queue for requesting the service by the one or more of the plurality of service providers, and use the result information of the second queue for executing the at least one of the atomic dialogue activities.

7. A dialogue system comprising:
an input device configured for receiving user dialogue input as first dialogue moves of a conversation;
an output device configured to output system dialogue output as second dialogue moves of the conversation;
processing circuitry; and
a data storage device storing a hierarchical dialogue structure that forms a structured history of the first and second dialogue moves and represents the conversation as a plurality of hierarchically arranged nodes;
wherein the processing circuitry is configured to provide a service indicated by the hierarchical dialogue structure to have been requested by the user dialogue input of the conversation, and is configured to, for each of the first and second dialogue moves of the conversation, update the hierarchical dialogue structure to include a respective one of the nodes.

8. The system of claim 7, wherein the hierarchically arranged nodes correspond to a set of atomic dialogue activities of a complex dialogue activity with which the hierarchical dialogue structure associates the conversation.

9. The system of claim 8, wherein the processing circuitry is configured to dynamically add to the hierarchical dialogue structure a respective node for each occurrence of an atomic dialogue activity of the complex dialogue activity.

10. The system of claim 8, wherein:
the processing circuitry is configured to, in response to one of the first dialogue moves, select one of a plurality of complex service activities according to which to provide the service;
the selected complex service activity includes a plurality of atomic service activities;
at least one of the atomic service activities is performed using information obtained from at least one of the first dialogue moves; and
at least one of atomic dialogue activities is performed using information obtained as an output of the execution of at least one of the atomic service activities.

11. The system of claim 7, wherein the processing circuitry is configured to resolve an ambiguity in a received user dialogue input based on a dialogue context indicated in the hierarchical dialogue structure.

12. The system of claim 7, wherein:
the processing circuitry is configured to process the first dialogue moves, perform the second dialogue moves, and provide the service according to a plan script stored in the data storage device and invoked in response to one of the first dialogue moves; and the plan script defines a sequence of atomic dialogue activities and a set of triggers for triggering execution of a plurality of atomic service activities by which to provide the service.

13. The system of claim 12, wherein at least one of the atomic service activities is defined by a definition that includes a variable, a value for which is obtained from one of the first dialogue moves.

14. The system of claim 7, wherein, for each of at least one of the updates, the processing circuitry is configured to determine which, if any, of a plurality of dialog moves represented by nodes previously added to the hierarchical dialogue structure relates to the respective node added by the update, the respective added node being added as a child of the determined node.

15. A non-transitory computer-readable medium on which are stored instructions that are executable by a processor and that, when executed by the processor, cause the processor to perform a dialogue processing method, the method comprising:
receiving user dialogue input as first dialogue moves of a conversation;
outputting system dialogue output as second dialogue moves of the conversation;
storing a hierarchical dialogue structure that forms a structured history of the first and second dialogue moves and represents the conversation as a plurality of hierarchically arranged nodes, wherein the storing includes, for each of the first and second dialogue moves of the conversation, updating the hierarchical dialogue structure to include a respective one of the nodes; and
providing a service indicated by the hierarchical dialogue structure to have been requested by the user dialogue input of the conversation.

16. The non-transitory computer-readable medium of claim 15, wherein the hierarchically arranged nodes correspond to a set of atomic dialogue activities of a complex dialogue activity with which the hierarchical dialogue structure associates the conversation.

17. The non-transitory computer-readable medium of claim 16, wherein the storing includes dynamically adding to the hierarchical dialogue structure a respective node for each occurrence of an atomic dialogue activity of the complex dialogue activity.

18. The non-transitory computer-readable medium of claim 16, wherein:
the method includes, in response to one of the first dialogue moves, selecting one of a plurality of complex service activities according to which to provide the service;
the selected complex service activity includes a plurality of atomic service activities;
at least one of the atomic service activities is performed using information obtained from at least one of the first dialogue moves; and
at least one of atomic dialogue activities is performed using information obtained as an output of the execution of at least one of the atomic service activities.

19. The non-transitory computer-readable medium of claim 15, wherein the method further includes resolving an ambiguity in a received user dialogue input based on a dialogue context indicated in the hierarchical dialogue structure.

20. The non-transitory computer-readable medium of claim 15, wherein:

the first dialogue moves are processed, the second dialogue moves are performed, and the service is provided according to a plan script stored in the data storage device and invoked in response to one of the first dialogue moves; and the plan script defines a sequence of atomic dialogue activities and a set of triggers for triggering execution of a plurality of atomic service activities by which to provide the service.

* * * * *